US008019085B2

(12) United States Patent  
Adams et al.

(10) Patent No.: US 8,019,085 B2
(45) Date of Patent: Sep. 13, 2011

(54) SYSTEM AND METHOD FOR SENDING ENCRYPTED MESSAGES TO A DISTRIBUTION LIST

(75) Inventors: Neil P. Adams, Waterloo (CA); Michael S. Brown, Waterloo (CA); Michael K. Brown, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 4 days.

(21) Appl. No.: 12/610,590

(22) Filed: Nov. 2, 2009

(65) Prior Publication Data

US 2010/0049979 A1    Feb. 25, 2010

Related U.S. Application Data

(63) Continuation of application No. 11/073,677, filed on Mar. 8, 2005, now Pat. No. 7,613,304.

(51) Int. Cl.
*H04L 9/08* (2006.01)

(52) U.S. Cl. .......... 380/282; 380/44; 380/277; 380/259; 380/284; 713/170; 713/171; 713/168; 713/156; 713/176; 709/245; 709/206; 709/200; 370/352

(58) Field of Classification Search .................. 713/170, 713/171, 168, 156, 176; 380/44, 277, 259, 380/282, 284; 709/245, 206, 200; 370/352
See application file for complete search history.

(56) References Cited

U.S. PATENT DOCUMENTS 6,370,249 B1    4/2002    Van Oorschot
6,438,608 B2    8/2002    Biliris et al.

(Continued)

FOREIGN PATENT DOCUMENTS

EP    1701501    5/2007

(Continued)

OTHER PUBLICATIONS

Decision to grant a European patent application pursuant to Article 97(2) EPC. Application No. 05101769.7. Dated: Apr. 19, 2007.

(Continued)

*Primary Examiner* — Vivek Srivastava
*Assistant Examiner* — Hee Song
(74) *Attorney, Agent, or Firm* — Bereskin & Parr LLP/S.E.N.C.R.L., s.r.l.

(57) ABSTRACT

A system and method for sending encrypted messages to a distribution list that facilitates the sending of such messages only to individuals or other entities associated with the distribution list that will be able to read the message. In one embodiment, the method comprises the steps of: identifying a distribution list address in a message; determining one or more member addresses associated with the distribution list address; for each member address, determining if a public key for a member identified by the respective member address is available on the computing device; encrypting the message to each member identified by the one or more member addresses for which a public key for the respective member is available on the computing device; sending the encrypted message to the distribution list address if each of the one or more member addresses associated with the distribution list identifies a member for which a public key is available on the computing device; and sending the message to each of the one or more member addresses that identifies a member for which a public key is available on the computing device otherwise.

19 Claims, 9 Drawing Sheets

U.S. PATENT DOCUMENTS

| | | | |
|---|---|---|---|
| 6,553,425 | B1 | 4/2003 | Shah et al. |
| 6,718,168 | B2 * | 4/2004 | Ala-Luukko et al. ...... 455/412.1 |
| 6,912,656 | B1 | 6/2005 | Perlman et al. |
| 6,970,862 | B2 | 11/2005 | Kwan |
| 7,269,726 | B1 | 9/2007 | Corella |
| 7,613,304 | B2 | 11/2009 | Adams et al. |
| 2003/0172262 | A1 | 9/2003 | Curry |
| 2004/0066778 | A1 | 4/2004 | Laumen et al. |
| 2004/0133774 | A1 | 7/2004 | Callas et al. |
| 2004/0254918 | A1 * | 12/2004 | Pereira et al. ..................... 707/3 |
| 2005/0149442 | A1 | 7/2005 | Adams et al. |
| 2006/0143278 | A1 | 6/2006 | Bauchot et al. |

FOREIGN PATENT DOCUMENTS

| | | |
|---|---|---|
| HK | 1094927 | 7/2007 |
| WO | 01/41353 | 6/2001 |
| WO | 03/079628 | 9/2003 |

OTHER PUBLICATIONS

Canadian Second Office Action. Application No. 2,538,443. Dated: Apr. 22, 2009.

Canadian Third Office Action. Application No. 2,538,443. Dated: Feb. 9, 2010.

Herfert, M., "Security-Enhanced Mailing Lists", IEEE Network, IEEE Inc. New York, US, vol. 11, Issue No. 3, May 1997.

Canadian First Office Action. Application No. 2,538,443. Dated: Aug. 5, 2008.

European Communication under Rule 51(4) EPC. Application No. 05101769.7. Dated: Nov. 30, 2006.

European Search Report. Application No. 05101769.7. Dated: Nov. 9, 2005.

* cited by examiner

SYSTEM AND METHOD FOR SENDING ENCRYPTED MESSAGES TO A DISTRIBUTION LIST

CROSS REFERENCE TO RELATED APPLICATION

This application is a continuation of prior U.S. patent application Ser. No. 11/073,677, filed on Mar. 8, 2005, the entirety of which is hereby incorporated by reference.

FIELD OF THE INVENTION

The invention relates generally to the processing of messages, such as e-mail messages, and more specifically to a system and method for sending encrypted messages to one or more addresses of a distribution list.

BACKGROUND OF THE INVENTION

Electronic mail ("e-mail") messages may be encoded using one of a number of known protocols. Some of these protocols, such as Secure Multiple Internet Mail Extensions (S/MIME) for example, rely on public and private encryption keys to provide confidentiality and integrity, and on a Public Key Infrastructure (PKI) to communicate information that provides authentication and authorization. Data encrypted using a private key of a private key/public key pair can only be decrypted using the corresponding public key of the pair, and vice-versa. The authenticity of public keys used in the encoding of messages is validated using certificates. In particular, if a user of a computing device wishes to encrypt a message before the message is sent to a particular individual, the user will require a certificate for that individual. That certificate will typically comprise the public key of the individual, as well as other identification-related information. As a further example, if a user of a computing device wishes to encrypt a message to be sent to multiple individuals, the user will require a certificate for each of those individuals.

Consider the situation where the user wishes to send an encrypted message to all individuals associated with a distribution list. Where possible, it is preferable that the message be encrypted such that each individual associated with the distribution list will be able to read the message when it is received. However, this may not always be readily performed. For example, the sender may not possess or may be otherwise unable to retrieve the certificate of each individual associated with the distribution list. In other cases, certain individuals associated with the distribution list may not be equipped to send and receive encoded messages, and therefore a certificate may not exist for those individuals.

In one known system, if an attempt is made to send an encrypted message to all the addresses of a distribution list and it is determined that not all of the individuals associated with the distribution list will be able to read the message, the sender of the message is given three options: (1) to send the message unencrypted to all of the addresses of the distribution list; (2) to send the message encrypted to all of the addresses of the distribution list; or (3) to not send the message. This known system, however, is not adapted to send a message only to the recipients who will be able to read the encrypted message.

SUMMARY OF THE INVENTION

Embodiments of the invention are generally directed to a system and method for sending encrypted messages to one or more addresses of a distribution list. In particular, the system and method facilitates the sending of such messages only to individuals or other entities associated with the distribution list that will be able to read the message.

In one broad aspect of the invention, there is provided a method of sending encrypted messages from a computing device to a distribution list, the method comprising the steps of: identifying a distribution list address in a message; determining one or more member addresses associated with the distribution list address; for each member address, determining if a public key for a member identified by the respective member address is available on the computing device; encrypting the message to each member identified by the one or more member addresses for which a public key for the respective member is available on the computing device; sending the encrypted message to the distribution list address if each of the one or more member addresses associated with the distribution list identifies a member for which a public key is available on the computing device; and sending the message to each of the one or more member addresses that identifies a member for which a public key is available on the computing device if at least one of the one or more member addresses associated with the distribution list does not identify a member for which a public key is available on the computing device.

BRIEF DESCRIPTION OF THE DRAWINGS

For a better understanding of embodiments of the invention, and to show more clearly how they may be carried into effect, reference will now be made, by way of example, to the accompanying drawings in which.

DETAILED DESCRIPTION OF EMBODIMENTS OF THE INVENTION

Some embodiments of the invention make use of a mobile station. A mobile station is a two-way communication device with advanced data communication capabilities having the capability to communicate with other computer systems, and is also referred to herein generally as a mobile device. A mobile device may also include the capability for voice communications. Depending on the functionality provided by a mobile device, it may be referred to as a data messaging device, a two-way pager, a cellular telephone with data messaging capabilities, a wireless Internet appliance, or a data communication device (with or without telephony capabilities). A mobile device communicates with other devices through a network of transceiver stations.

Figure 1:
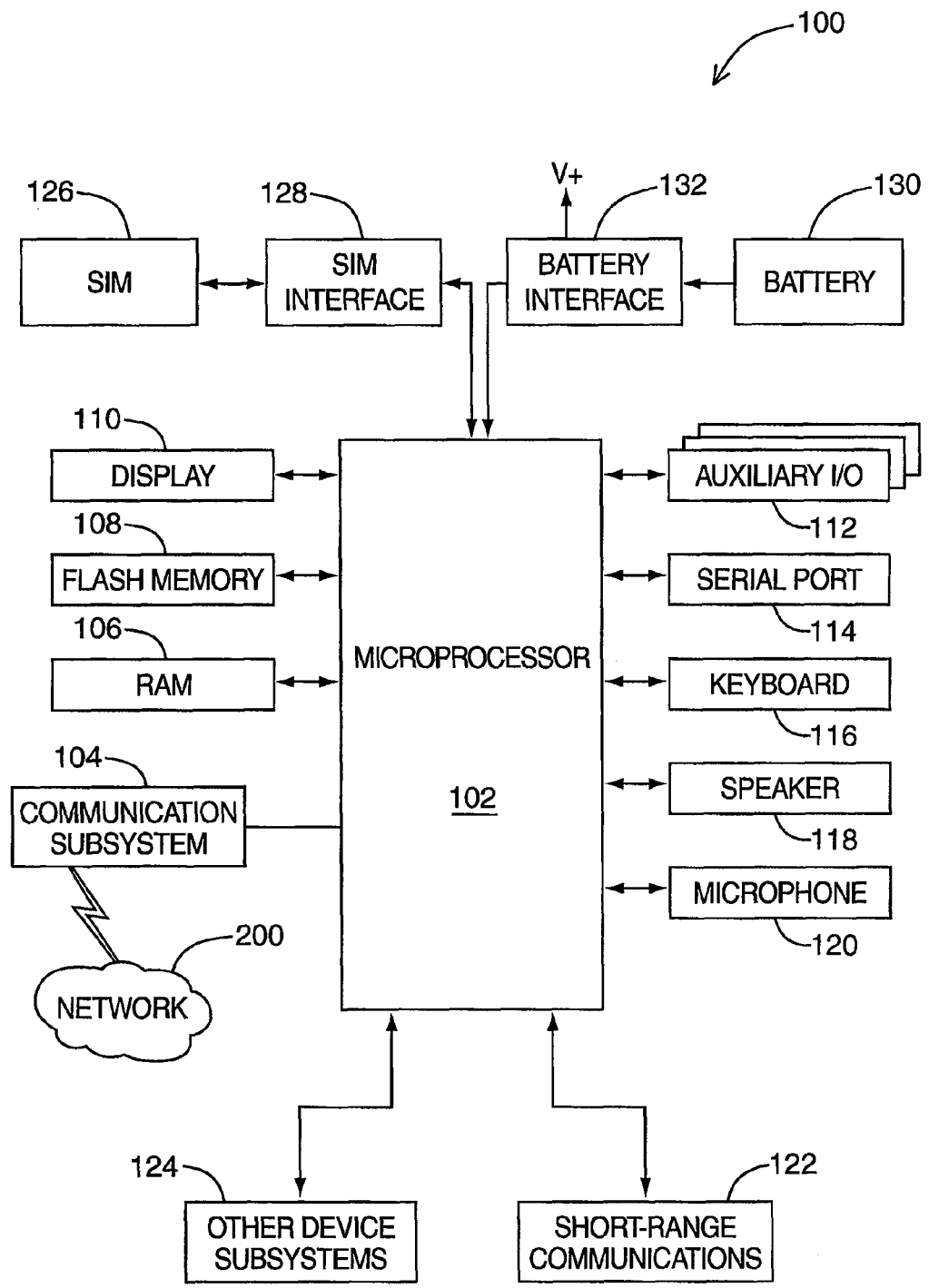
FIG. 1 is a block diagram of a mobile device in one example implementation.
Figure 2:
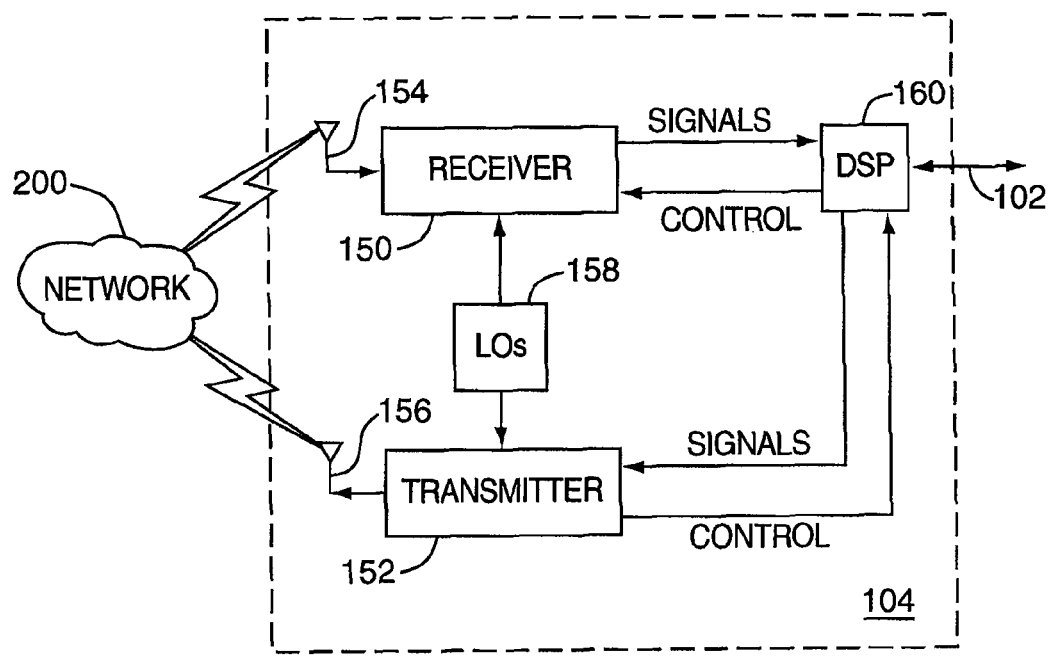
FIG. 2 is a block diagram of a communication subsystem component of the mobile device of FIG. 1.
Figure 3:
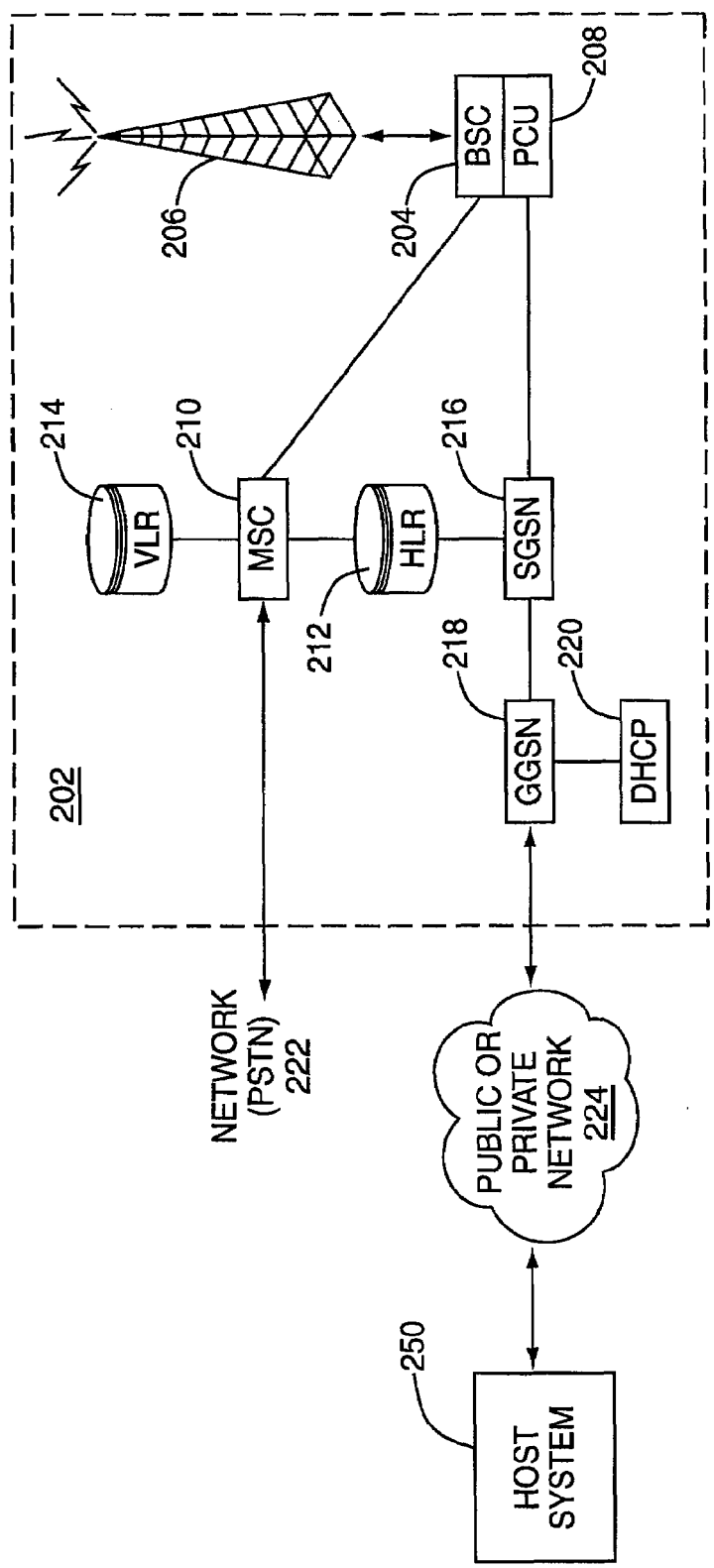
FIG. 3 is a block diagram of a node of a wireless network.

To aid the reader in understanding the structure of a mobile device and how it communicates with other devices, reference is made to FIGS. 1 through 3.

Referring first to FIG. 1, a block diagram of a mobile device in one example implementation is shown generally as 100. Mobile device 100 comprises a number of components, the controlling component being microprocessor 102. Microprocessor 102 controls the overall operation of mobile device 100. Communication functions, including data and voice communications, are performed through communication subsystem 104. Communication subsystem 104 receives messages from and sends messages to a wireless network 200. In this example implementation of mobile device 100, communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behaviour described herein, and it will also be understood by persons skilled in the art that the invention is intended to use any other suitable standards that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network associated with mobile device 100 is a GSM/GPRS wireless network in one example implementation of mobile device 100, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some older examples of data-centric networks include the MOBITEX™ Radio Network and the DATATAC™ Radio Network. Examples of older voice-centric data networks include Personal Communication Systems (PCS) networks like GSM and Time Division Multiple Access (TDMA) systems.

Microprocessor 102 also interacts with additional subsystems such as a Random Access Memory (RAM) 106, flash memory 108, display 110, auxiliary input/output (I/O) subsystem 112, serial port 114, keyboard 116, speaker 118, microphone 120, short-range communications 122 and other devices 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, and device-resident functions such as a calculator or task list. Operating system software used by microprocessor 102 is typically stored in a persistent store such as flash memory 108, which may alternatively be a read-only memory (ROM) or similar storage element (not shown). Those skilled in the art will appreciate that the operating system, specific device applications, or parts thereof, may be temporarily loaded into a volatile store such as RAM 106.

Mobile device 100 may send and receive communication signals over network 200 after required network registration or activation procedures have been completed. Network access is associated with a subscriber or user of a mobile device 100. To identify a subscriber, mobile device 100 requires a Subscriber Identity Module or "SIM" card 126 to be inserted in a SIM interface 128 in order to communicate with a network. SIM 126 is one type of a conventional "smart card" used to identify a subscriber of mobile device 100 and to personalize the mobile device 100, among other things. Without SIM 126, mobile device 100 is not fully operational for communication with network 200. By inserting SIM 126 into SIM interface 128, a subscriber can access all subscribed services. Services could include: web browsing and messaging such as e-mail, voice mail, Short Message Service (SMS), and Multimedia Messaging Services (MMS). More advanced services may include: point of sale, field service and sales force automation. SIM 126 includes a processor and memory for storing information. Once SIM 126 is inserted in SIM interface 128, it is coupled to microprocessor 102. In order to identify the subscriber, SIM 126 contains some user parameters such as an International Mobile Subscriber Identity (IMSI). An advantage of using SIM 126 is that a subscriber is not necessarily bound by any single physical mobile device. SIM 126 may store additional subscriber information for a mobile device as well, including datebook (or calendar) information and recent call information.

Mobile device 100 is a battery-powered device and includes a battery interface 132 for receiving one or more rechargeable batteries 130. Battery interface 132 is coupled to a regulator (not shown), which assists battery 130 in providing power V+ to mobile device 100. Although current technology makes use of a battery, future technologies such as micro fuel cells may provide the power to mobile device 100.

Microprocessor 102, in addition to its operating system functions, enables execution of software applications on mobile device 100. A set of applications that control basic device operations, including data and voice communication applications, will normally be installed on mobile device 100 during its manufacture. Another application that may be loaded onto mobile device 100 would be a personal information manager (PIM). A PIM has functionality to organize and manage data items of interest to a subscriber, such as, but not limited to, e-mail, calendar events, voice mails, appointments, and task items. A PIM application has the ability to send and receive data items via wireless network 200. PIM data items may be seamlessly integrated, synchronized, and updated via wireless network 200 with the mobile device subscriber's corresponding data items stored and/or associated with a host computer system. This functionality creates a mirrored host computer on mobile device 100 with respect to such items. This can be particularly advantageous where the host computer system is the mobile device subscriber's office computer system.

Additional applications may also be loaded onto mobile device 100 through network 200, auxiliary I/O subsystem 112, serial port 114, short-range communications subsystem 122, or any other suitable subsystem 124. This flexibility in application installation increases the functionality of mobile device 100 and may provide enhanced on-device functions, communication-related functions, or both. For example, secure communication applications may enable electronic commerce functions and other such financial transactions to be performed using mobile device 100.

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

Short-range communications subsystem 122 provides for communication between mobile device 100 and different systems or devices, without the use of network 200. For example, subsystem 122 may include an infrared device and associated circuits and components for short-range communication. Examples of short-range communication would include standards developed by the Infrared Data Association (IrDA), Bluetooth, and the 802.11 family of standards developed by IEEE.

In use, a received signal such as a text message, an e-mail message, or web page download will be processed by communication subsystem 104 and input to microprocessor 102. Microprocessor 102 will then process the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary subsystem 112 may include devices such as: a touch screen, mouse, track ball, infrared fingerprint detector, or a roller wheel with dynamic button pressing capability. Keyboard 116 is an alphanumeric keyboard and/or telephone-type keypad. A composed item may be transmitted over network 200 through communication subsystem 104.

For voice communications, the overall operation of mobile device 100 is substantially similar, except that the received signals would be output to speaker 118, and signals for transmission would be generated by microphone 120. Alternative voice or audio I/O subsystems, such as a voice message recording subsystem, may also be implemented on mobile device 100. Although voice or audio signal output is accomplished primarily through speaker 118, display 110 may also be used to provide additional information such as the identity of a calling party, duration of a voice call, or other voice call related information.

Referring now to FIG. 2, a block diagram of the communication subsystem component 104 of FIG. 1 is shown. Communication subsystem 104 comprises a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 is dependent upon the network 200 in which mobile device 100 is intended to operate, thus it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is a limited resource that must be conserved, typically due to limits in overall bandwidth and limited battery power of mobile device 100.

When mobile device 100 is fully operational, transmitter 152 is typically keyed or turned on only when it is sending to network 200 and is otherwise turned off to conserve resources. Similarly, receiver 150 is periodically turned off to conserve power until it is needed to receive signals or information (if at all) during designated time periods.

Referring now to FIG. 3, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with General Packet Radio Service (GPRS) and Global Systems for Mobile (GSM) technologies. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 also contains a Packet Control Unit (PCU) 208 that connects to SGSN 216 to control segmentation, radio channel allocation and to satisfy packet switched requirements. To track mobile device location and availability for both circuit switched and packet switched management, HLR 212 is shared between MSC 210 and SGSN 216. Access to VLR 214 is controlled by MSC 210.

Station 206 is a fixed transceiver station. Station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in HLR 212. HLR 212 also contains location information for each registered mobile device and can be queried to determine the current location of a mobile device. MSC 210 is responsible for a group of location areas and stores the data of the mobile devices currently in its area of responsibility in VLR 214. Further VLR 214 also contains information on mobile devices that are visiting other networks. The information in VLR 214 includes part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times and at the same time requiring less use of computing resources.

SGSN 216 and GGSN 218 are elements added for GPRS support; namely packet switched data support, within GSM. SGSN 216 and MSC 210 have similar responsibilities within wireless network 200 by keeping track of the location of each mobile device 100. SGSN 216 also performs security functions and access control for data traffic on network 200. GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring a DHCP server 220 connected to the GGSN 218. There are many mechanisms for dynamic IP assignment, including using a combination of a Remote Authentication Dial-In User Service (RADIUS) server and DHCP server. Once the GPRS Attach is complete, a logical connection is established from a mobile device 100, through PCU 208, and SGSN 216 to an Access Point Node (APN) within GGSN 218. The APN represents a logical end of an IP tunnel that can either access direct Internet compatible services or private network connections. The APN also represents a security mechanism for network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, network 200 will run an idle timer for each PDP Context to determine if there is a lack of activity. When a mobile device 100 is not using its PDP Context, the PDP Context can be deallocated and the IP address returned to the IP address pool managed by DHCP server 220.

Figure 4:
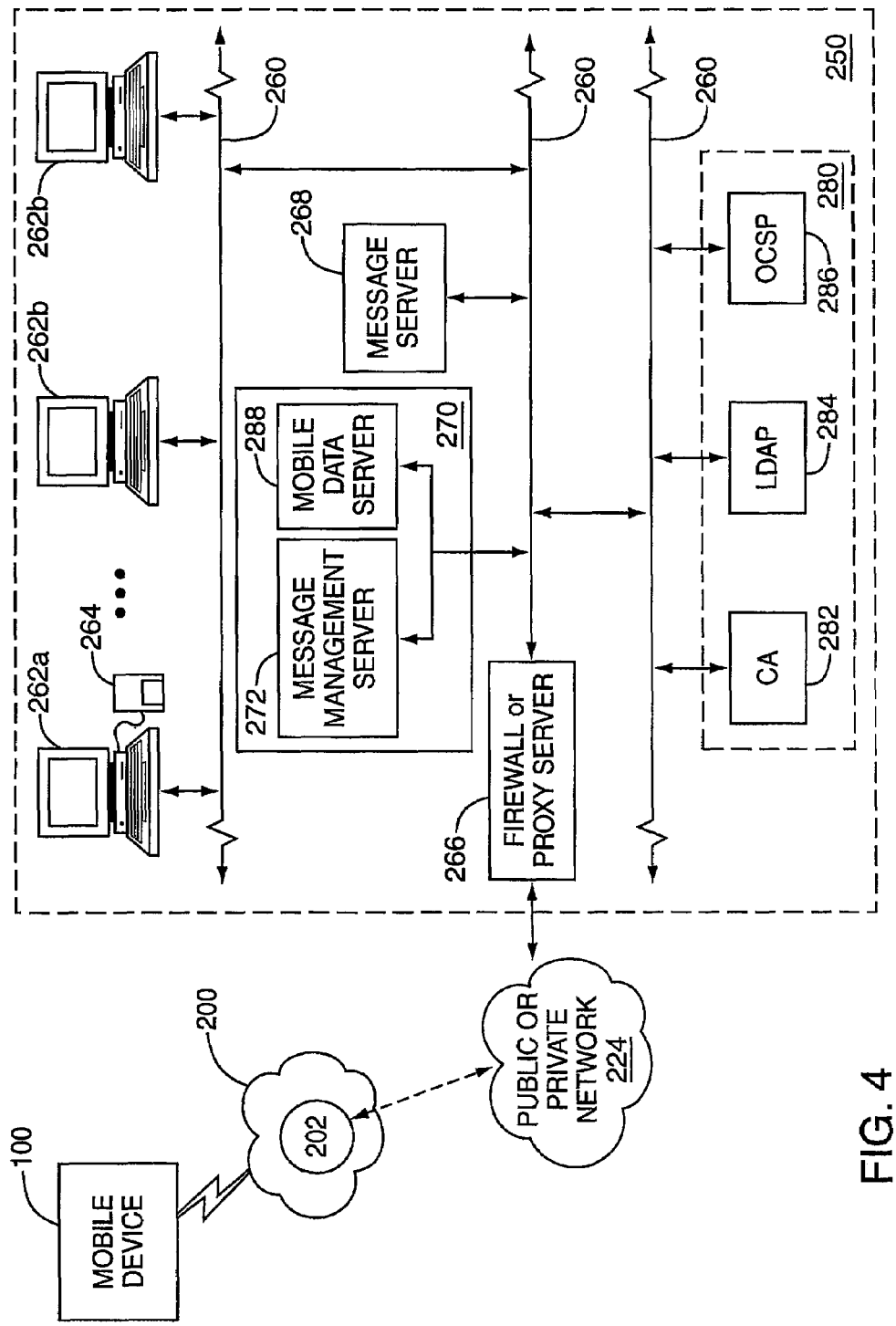
FIG. 4 is a block diagram illustrating components of a host system in one example configuration.

Referring now to FIG. 4, a block diagram illustrating components of a host system in one example configuration is shown. Host system 250 will typically be a corporate office or other local area network (LAN), but may instead be a home office computer or some other private system, for example, in variant implementations. In this example shown in FIG. 4, host system 250 is depicted as a LAN of an organization to which a user of mobile device 100 belongs.

LAN 250 comprises a number of network components connected to each other by LAN connections 260. For instance, a user's desktop computer 262a with an accompanying cradle 264 for the user's mobile device 100 is situated on LAN 250. Cradle 264 for mobile device 100 may be coupled to computer 262a by a serial or a Universal Serial Bus (USB) connection, for example. Other user computers 262b are also situated on LAN 250, and each may or may not be equipped with an accompanying cradle 264 for a mobile device. Cradle 264 facilitates the loading of information (e.g. PIM data, private symmetric encryption keys to facilitate secure communications between mobile device 100 and LAN 250) from user computer 262a to mobile device 100, and may be particularly useful for bulk information updates often performed in initializing mobile device 100 for use. The information downloaded to mobile device 100 may include certificates used in the exchange of messages. It will be understood by persons skilled in the art that user computers 262a, 262b will typically be also connected to other peripheral devices not explicitly shown in FIG. 4.

Furthermore, only a subset of network components of LAN 250 are shown in FIG. 4 for ease of exposition, and it will be understood by persons skilled in the art that LAN 250 will comprise additional components not explicitly shown in FIG. 4, for this example configuration. More generally, LAN 250 may represent a smaller part of a larger network [not shown] of the organization, and may comprise different components and/or be arranged in different topologies than that shown in the example of FIG. 4.

In this example, mobile device 100 communicates with LAN 250 through a node 202 of wireless network 200 and a shared network infrastructure 224 such as a service provider network or the public Internet. Access to LAN 250 may be provided through one or more routers [not shown], and computing devices of LAN 250 may operate from behind a firewall or proxy server 266.

In a variant implementation, LAN 250 comprises a wireless VPN router [not shown] to facilitate data exchange between the LAN 250 and mobile device 100. The concept of a wireless VPN router is new in the wireless industry and implies that a VPN connection can be established directly through a specific wireless network to mobile device 100. The possibility of using a wireless VPN router has only recently been available and could be used when the new Internet Protocol (IP) Version 6 (IPV6) arrives into IP-based wireless networks. This new protocol will provide enough IP addresses to dedicate an IP address to every mobile device, making it possible to push information to a mobile device at any time. An advantage of using a wireless VPN router is that it could be an off-the-shelf VPN component, not requiring a separate wireless gateway and separate wireless infrastructure to be used. A VPN connection would preferably be a Transmission Control Protocol (TCP)/IP or User Datagram Protocol (UDP)/IP connection to deliver the messages directly to mobile device 100 in this variant implementation.

Messages intended for a user of mobile device 100 are initially received by a message server 268 of LAN 250. Such messages may originate from any of a number of sources. For instance, a message may have been sent by a sender from a computer 262b within LAN 250, from a different mobile device [not shown] connected to wireless network 200 or to a different wireless network, or from a different computing device or other device capable of sending messages, via the shared network infrastructure 224, and possibly through an application service provider (ASP) or Internet service provider (ISP), for example.

Message server 268 typically acts as the primary interface for the exchange of messages, particularly e-mail messages, within the organization and over the shared network infrastructure 224. Each user in the organization that has been set up to send and receive messages is typically associated with a user account managed by message server 268. One example of a message server 268 is a MICROSOFT EXCHANGE™ Server. In some implementations, LAN 250 may comprise multiple message servers 268. Message server 268 may also be adapted to provide additional functions beyond message management, including the management of data associated with calendars and task lists, for example.

When messages are received by message server 268, they are typically stored in a message store [not explicitly shown], from which messages can be subsequently retrieved and delivered to users. For instance, an e-mail client application operating on a user's computer 262a may request the e-mail messages associated with that user's account stored on message server 268. These messages would then typically be retrieved from message server 268 and stored locally on computer 262a.

When operating mobile device 100, the user may wish to have e-mail messages retrieved for delivery to the handheld. An e-mail client application operating on mobile device 100 may also request messages associated with the user's account from message server 268. The e-mail client may be configured (either by the user or by an administrator, possibly in accordance with an organization's information technology (IT) policy) to make this request at the direction of the user, at some pre-defined time interval, or upon the occurrence of some pre-defined event. In some implementations, mobile device 100 is assigned its own e-mail address, and messages addressed specifically to mobile device 100 are automatically redirected to mobile device 100 as they are received by message server 268.

To facilitate the wireless communication of messages and message-related data between mobile device 100 and components of LAN 250, a number of wireless communications support components 270 may be provided. In this example implementation, wireless communications support components 270 comprise a message management server 272, for example. Message management server 272 is used to specifically provide support for the management of messages, such as e-mail messages, that are to be handled by mobile devices. Generally, while messages are still stored on message server 268, message management server 272 can be used to control when, if, and how messages should be sent to mobile device 100. Message management server 272 also facilitates the handling of messages composed on mobile device 100, which are sent to message server 268 for subsequent delivery.

For example, message management server 272 may: monitor the user's "mailbox" (e.g. the message store associated with the user's account on message server 268) for new e-mail messages; apply user-definable filters to new messages to determine if and how the messages will be relayed to the user's mobile device 100; compress and encrypt new messages (e.g. using an encryption technique such as Data Encryption Standard (DES) or Triple DES) and push them to mobile device 100 via the shared network infrastructure 224 and wireless network 200; and receive messages composed on mobile device 100 (e.g. encrypted using Triple DES), decrypt and decompress the composed messages, re-format the composed messages if desired so that they will appear to have originated from the user's computer 262a, and re-route the composed messages to message server 268 for delivery.

Certain properties or restrictions associated with messages that are to be sent from and/or received by mobile device 100 can be defined (e.g. by an administrator in accordance with IT policy) and enforced by message management server 272. These may include whether mobile device 100 may receive encrypted and/or signed messages, minimum encryption key sizes, whether outgoing messages must be encrypted and/or signed, and whether copies of all secure messages sent from mobile device 100 are to be sent to a pre-defined copy address, for example.

Message management server 272 may also be adapted to provide other control functions, such as only pushing certain message information or pre-defined portions (e.g. "blocks") of a message stored on message server 268 to mobile device 100. For example, when a message is initially retrieved by mobile device 100 from message server 268, message management server 272 is adapted to push only the first part of a message to mobile device 100, with the part being of a pre-defined size (e.g. 2 KB). The user can then request more of the message, to be delivered in similar-sized blocks by message management server 272 to mobile device 100, possibly up to a maximum pre-defined message size.

Accordingly, message management server 272 facilitates better control over the type of data and the amount of data that is communicated to mobile device 100, and can help to minimize potential waste of bandwidth or other resources.

It will be understood by persons skilled in the art that message management server 272 need not be implemented on a separate physical server in LAN 250 or other network. For example, some or all of the functions associated with message management server 272 may be integrated with message server 268, or some other server in LAN 250. Furthermore, LAN 250 may comprise multiple message management servers 272, particularly in variant implementations where a large number of mobile devices needs to be supported.

Certificates may be used in the processing of encoded messages, such as e-mail messages that are encrypted and/or signed. While Simple Mail Transfer Protocol (SMTP), RFC822 headers, and Multipurpose Internet Mail Extensions (MIME) body parts may be used to define the format of a typical e-mail message not requiring encoding, Secure/MIME (S/MIME), a version of the MIME protocol, may be used in the communication of encoded messages (i.e. in secure messaging applications). S/MIME enables end-to-end authentication and confidentiality, and protects data integrity and privacy from the time an originator of a message sends a message until it is decoded and read by the message recipient. Other known standards and protocols may be employed to facilitate secure message communication, such as PRETTY GOOD PRIVACY™ (PGP), OpenPGP, and others known in the art.

Secure messaging protocols such as S/MIME rely on public and private encryption keys to provide confidentiality and integrity, and on a Public Key Infrastructure (PKI) to communicate information that provides authentication and authorization. Data encrypted using a private key of a private key/public key pair can only be decrypted using the corresponding public key of the pair, and vice-versa. Private key information is never made public, whereas public key information is shared.

For example, if a sender wishes to send a message to a recipient in encrypted form, the recipient's public key is used to encrypt a message, which can then be decrypted only using the recipient's private key. Alternatively, in some encoding techniques, a one-time session key is generated and used to encrypt the body of a message, typically with a symmetric encryption technique (e.g. Triple DES). The session key is then encrypted using the recipient's public key (e.g. with a public key encryption algorithm such as RSA), which can then be decrypted only using the recipient's private key. The decrypted session key can then be used to decrypt the message body. The message header may be used to specify the particular encryption scheme that must be used to decrypt the message. Other encryption techniques based on public key cryptography may be used in variant implementations. However, in each of these cases, only the recipient's private key may be used to facilitate decryption of the message, and in this way, the confidentiality of messages can be maintained.

As a further example, a sender may sign a message using a digital signature. A digital signature is a digest of the message (e.g. a hash of the message) encoded using the sender's private key, which can then be appended to the outgoing message. To verify the digital signature of the message when received, the recipient uses the same technique as the sender (e.g. using the same standard hash algorithm) to obtain a digest of the received message. The recipient also uses the sender's public key to decode the digital signature, in order to obtain what should be a matching digest for the received message. If the digests of the received message do not match, this suggests that either the message content was changed during transport and/or the message did not originate from the sender whose public key was used for verification. Digital signature algorithms are designed in such a way that only someone with knowledge of the sender's private key should be able to encode a signature that the recipient will decode correctly using the sender's public key. Therefore, by verifying a digital signature in this way, authentication of the sender and message integrity can be maintained.

An encoded message may be encrypted, signed, or both encrypted and signed. The authenticity of public keys used in these operations is validated using certificates. A certificate is a digital document issued by a certificate authority (CA). Certificates are used to authenticate the association between users and their public keys, and essentially, provides a level of trust in the authenticity of the users' public keys. Certificates contain information about the certificate holder, with certificate contents typically formatted in accordance with an accepted standard (e.g. X.509).

Figure 5:
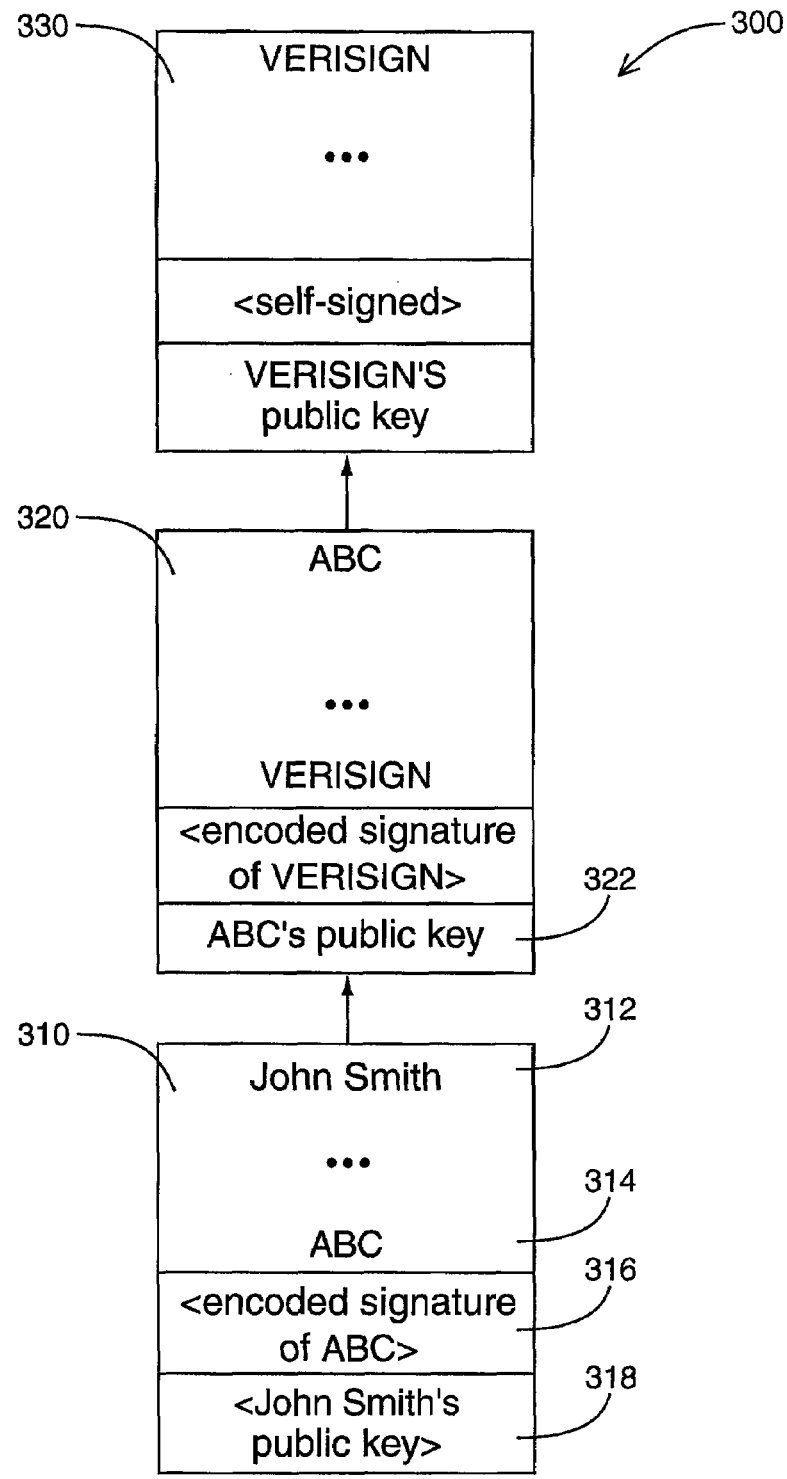
FIG. 5 is a block diagram showing an example of a certificate chain.

Consider FIG. 5, in which an example certificate chain 300 is shown. Certificate 310 issued to "John Smith" is an example of a certificate issued to an individual, which may be referred to as an end entity certificate. End entity certificate 310 typically identifies the certificate holder 312 (i.e. John Smith in this example) and the issuer of the certificate 314, and includes a digital signature of the issuer 316 and the certificate holder's public key 318. Certificate 310 will also typically include other information and attributes that identify the certificate holder (e.g. e-mail address, organization name, organizational unit name, location, etc.). When the individual composes a message to be sent to a recipient, it is customary to include that individual's certificate 310 with the message.

For a public key to be trusted, its issuing organization must be trusted. The relationship between a trusted CA and a user's public key can be represented by a series of related certificates, also referred to as a certificate chain. The certificate chain can be followed to determine the validity of a certificate.

For instance, in the example certificate chain 300 shown in FIG. 5, the recipient of a message purported to be sent by John Smith may wish to verify the trust status of certificate 310 attached to the received message. To verify the trust status of certificate 310 on a recipient's computing device (e.g. computer 262a of FIG. 4) for example, the certificate 320 of issuer ABC is obtained, and used to verify that certificate 310 was indeed signed by issuer ABC. Certificate 320 may already be stored in a certificate store on the computing device, or it may need to be retrieved from a certificate source (e.g. LDAP server 284 of FIG. 4 or some other public or private LDAP server). If certificate 320 is already stored in the recipient's computing device and the certificate has been designated as trusted by the recipient, then certificate 310 is considered to be trusted since it chains to a stored, trusted certificate.

However, in the example shown in FIG. 5, certificate 330 is also required to verify the trust status of certificate 310. Certificate 330 is self-signed, and is referred to as a "root certificate". Accordingly, certificate 320 may be referred to as an "intermediate certificate" in certificate chain 300; any given certificate chain to a root certificate, assuming a chain to the root certificate can be determined for a particular end entity certificate, may contain zero, one, or multiple intermediate certificates. If certificate 330 is a root certificate issued by a trusted source (from a large certificate authority such as Verisign or Entrust, for example), then certificate 310 may be considered to be trusted since it chains to a trusted certificate. The implication is that both the sender and the recipient of the message trust the source of the root certificate 330. If a certificate cannot be chained to a trusted certificate, the certificate may be considered to be "not trusted".

Certificate servers store information about certificates and lists identifying certificates that have been revoked. These certificate servers can be accessed to obtain certificates and to verify certificate authenticity and revocation status. For example, a Lightweight Directory Access Protocol (LDAP) server may be used to obtain certificates, and an Online Certificate Status Protocol (OCSP) server may be used to verify certificate revocation status.

Standard e-mail security protocols typically facilitate secure message transmission between non-mobile computing devices (e.g. computers 262a, 262b of FIG. 4; remote desktop devices). Referring again to FIG. 4, in order that signed messages received from senders may be read from mobile device 100 and encrypted messages be sent to those senders, mobile device 100 is adapted to store certificates and associated public keys of other individuals. Certificates stored on a user's computer 262a will typically be downloaded from computer 262a to mobile device 100 through cradle 264, for example.

Certificates stored on computer 262a and downloaded to mobile device 100 are not limited to certificates associated with individuals but may also include certificates issued to CAs, for example. Certain certificates stored in computer 262a and/or mobile device 100 can also be explicitly designated as "trusted" by the user. Accordingly, when a certificate is received by a user on mobile device 100, it can be verified on mobile device 100 by matching the certificate with one stored on mobile device 100 and designated as trusted, or otherwise determined to be chained to a trusted certificate.

Mobile device 100 may also be adapted to store the private key of the public key/private key pair associated with the user, so that the user of mobile device 100 can sign outgoing messages composed on mobile device 100, and decrypt messages sent to the user encrypted with the user's public key. The private key may be downloaded to mobile device 100 from the user's computer 262a through cradle 264, for example. The private key is preferably exchanged between the computer 262a and mobile device 100 so that the user may share one identity and one method for accessing messages.

User computers 262a, 262b can obtain certificates from a number of sources, for storage on computers 262a, 262b and/or mobile devices (e.g. mobile device 100). These certificate sources may be private (e.g. dedicated for use within an organization) or public, may reside locally or remotely, and may be accessible from within an organization's private network or through the Internet, for example. In the example shown in FIG. 4, multiple PKI servers 280 associated with the organization reside on LAN 250. PKI servers 280 include a CA server 282 for issuing certificates, an LDAP server 284 used to search for and download certificates (e.g. for individuals within the organization), and an OCSP server 286 used to verify the revocation status of certificates.

Certificates may be retrieved from LDAP server 284 by a user computer 262a, for example, to be downloaded to mobile device 100 via cradle 264. However, in a variant implementation, LDAP server 284 may be accessed directly (i.e. "over the air" in this context) by mobile device 100, and mobile device 100 may search for and retrieve individual certificates through a mobile data server 288. Similarly, mobile data server 288 may be adapted to allow mobile device 100 to directly query OCSP server 286 to verify the revocation status of certificates.

In variant implementations, only selected PKI servers 280 may be made accessible to mobile devices (e.g. allowing certificates to be downloaded only from a user's computer 262a, 262b, while allowing the revocation status of certificates to be checked from mobile device 100).

In variant implementations, certain PKI servers 280 may be made accessible only to mobile devices registered to particular users, as specified by an IT administrator, possibly in accordance with an IT policy, for example.

Other sources of certificates [not shown] may include a Windows certificate store, another secure certificate store on or outside LAN 250, and smart cards, for example.

Figure 6:
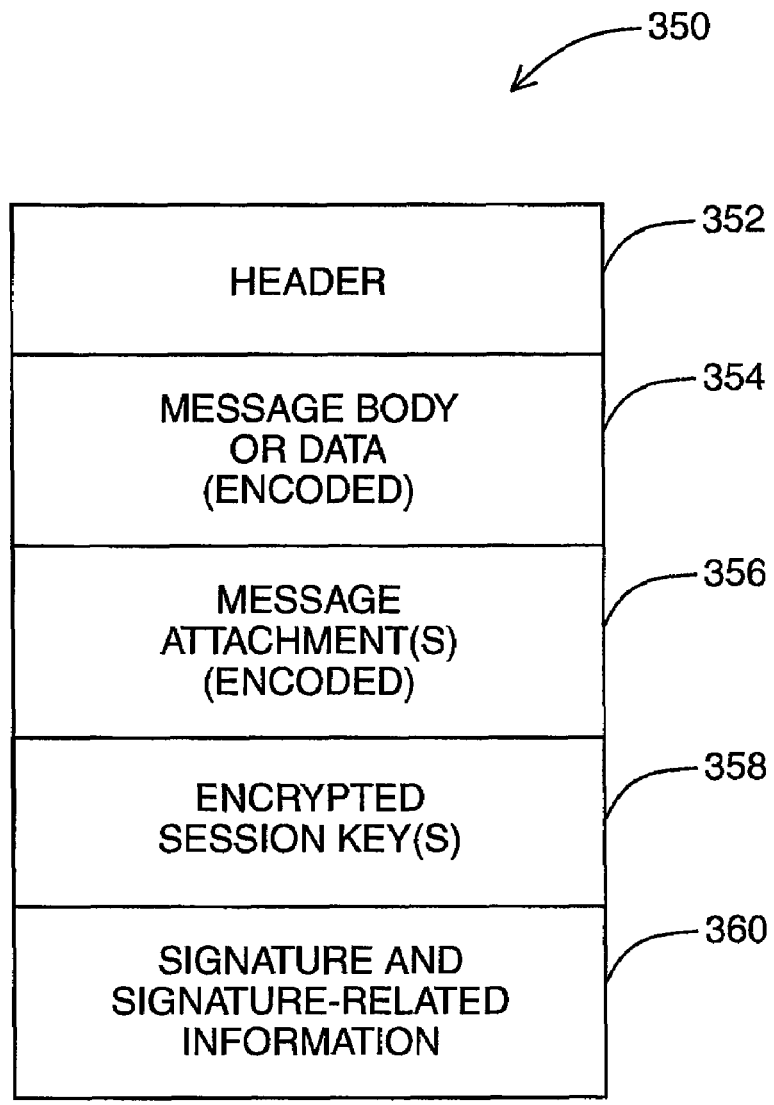
FIG. 6 is a block diagram illustrating components of an example of an encoded message.

Referring now to FIG. 6, a block diagram illustrating components of an example of an encoded message, as may be received by a message server (e.g. message server 268 of FIG. 4), is shown generally as 350. Encoded message 350 typically includes one or more of the following: a header portion 352, an encoded body portion 354, optionally one or more encoded attachments 356, one or more encrypted session keys 358, and signature and signature-related information 360. For example, header portion 352 typically includes addressing information such as "To", "From", and "CC" addresses, and may also include message length indicators, and sender encryption and signature scheme identifiers, for example. Actual message content normally includes a message body or data portion 354 and possibly one or more attachments 356, which may be encrypted by the sender using a session key. If a session key was used, it is typically encrypted for each intended recipient using the respective public key for each recipient, and included in the message at 358. If the message was signed, a signature and signature-related information 360 are also included. This may include the sender's certificate, for example.

Figures 7A, 7B:
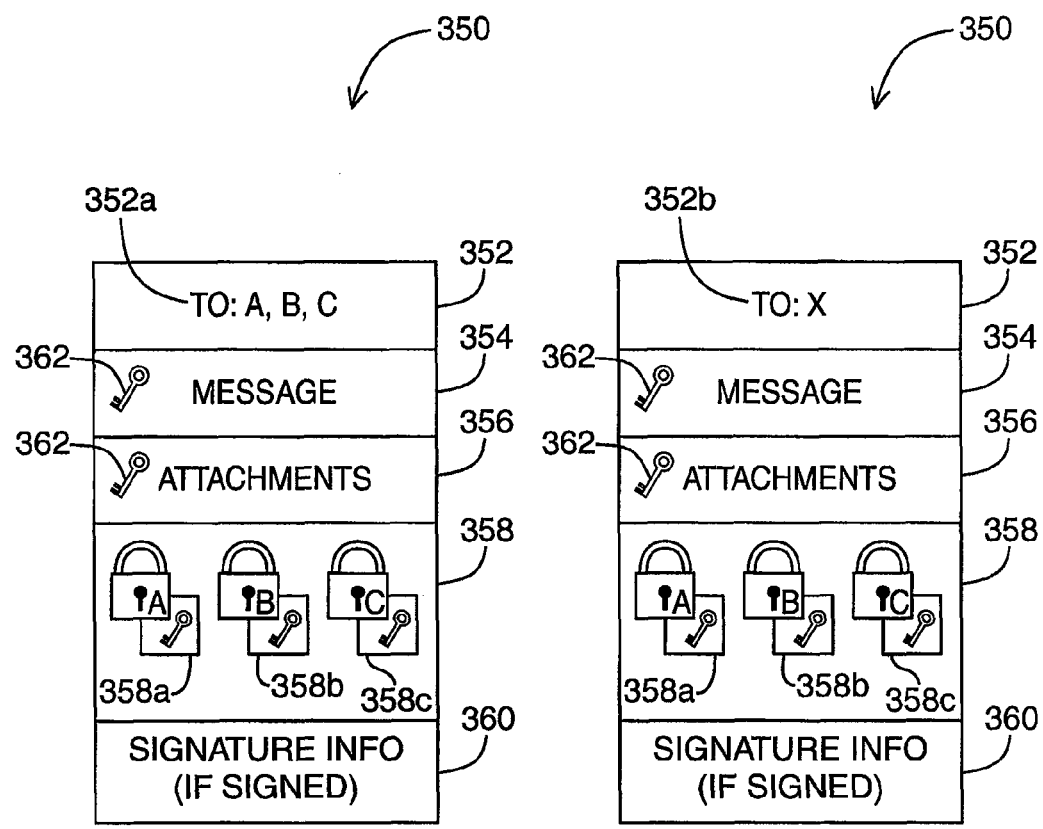
FIGS. 7A and 7B are block diagrams illustrating further examples of encoded messages.

Consider the further example of FIG. 7A, which illustrates a message 350 that is addressed to multiple recipients, namely A, B, and C in this example as shown in the "To" line 352a. The message body or data portion 354 of the message 350 (and possibly one or more attachments 356) is encrypted using a session key 362. Session key 362 is then encrypted for each intended recipient using the respective public key [not shown] for each recipient. In this example, encrypted session keys 358a, 358b and 358c have been encrypted using the public key of recipients A, B, and C respectively. The encrypted message 350 can now be sent securely to the recipients. When message 350 is received, each recipient can then decrypt a session key using its own private key, and use the decrypted session key to decrypt the message body or data portion 354 (and possibly attachments 356).

The encoded message formats as shown in the Figures herein are provided by way of example only, and persons skilled in the art will understand that encoded messages may exist in other formats. For example, depending on the specific messaging scheme used, components of an encoded message may appear in a different order than shown, and an encoded message may include fewer, additional, or different components, which may depend on whether the encoded message is encrypted, signed or both.

A distribution list, also commonly known as a mailing list, may be generally defined as a collection of addresses, commonly e-mail addresses. Distribution lists are typically defined so that, for example, a sender of e-mail may send a message to several recipients at one time without having to manually enter the recipients' addresses every time the message is sent to those recipients. Distribution lists can consist of a few addresses or many.

Put another way, distribution lists may be regarded as aliases that are used to facilitate the redirection of messages to a list of addresses that are managed, typically at a central server remote from a given client computing device. For example, a distribution list may be stored on a central message server (e.g. message server 268 of FIG. 4) and managed by an organization's IT administrator. In that case, the administrator may define distribution lists for the organization, and add to or delete addresses from the distribution lists.

For example, referring to FIG. 7B, the message 350 of the example of FIG. 7A is sent to a distribution list identified by alias "X" as shown in the "To" line 352b. X may be defined as an e-mail address (e.g. members@xyz.com) on a message server. When the message server receives an e-mail message to X, it expands X with the addresses of the distribution list in the header of the message, and sends a copy of the message to those addresses on that distribution list. As shown in the example of FIG. 7B, if X is a distribution list comprising the addresses of A, B, and C, then a copy of the message is sent by the message server to each of the addresses of A, B, and C. However, in contrast to the example of FIG. 7A, the sender of the message of FIG. 7B need not manually identify the address of each individual recipient, when sending the message to the distribution list from the sender's computing device.

Embodiments of the invention are generally directed to a system and method for sending encrypted messages to one or more addresses of a distribution list. In particular, the system and method facilitates the sending of such messages only to individuals or entities associated with the distribution list who will be able to read the message. In at least one embodiment of the invention, at least some of the steps of the method are performed by an application executing and residing on a mobile device (e.g. mobile device 100 of FIG. 4). In variant embodiments, the application may execute and reside on a computing device other than a mobile device. In at least one embodiment of the invention, the application is an e-mail application, although the steps of the method may be performed by one or more different applications in variant embodiments.

Figure 8A:
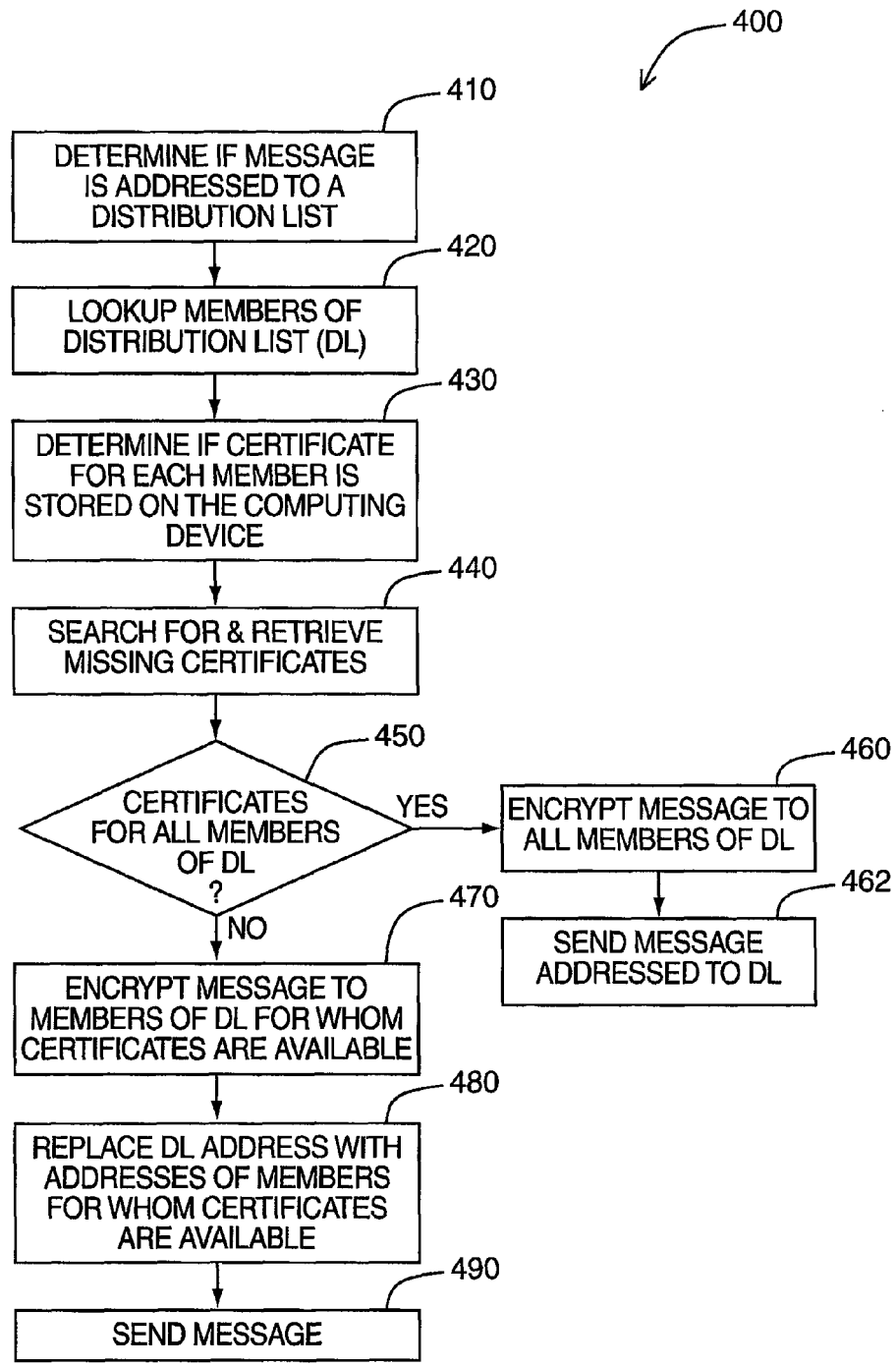
FIG. 8A is a flowchart illustrating steps in a method of sending encrypted messages to a distribution list in an embodiment of the invention.

Referring to FIG. 8A, a flowchart illustrating steps in a method of sending encrypted messages to a distribution list in an embodiment of the invention is shown generally as 400.

At step 410, an application residing and executing on a computing device (e.g. an e-mail application residing and executing on a mobile device) processes a message (e.g. an e-mail message) composed by a sender (e.g. a user of the mobile device) such that a determination is made as to whether the message is addressed to a distribution list. In this embodiment, the distribution list is one that is maintained by a central message server (e.g. message server 268 of FIG. 4).

More specifically, at this step, one or more of the addressees, as typically indicated in the header of the message, may be identified by the application as relating to a distribution list (DL). For example, the DL address may be stored as a contact in an address book of the computing device, and pre-identified as associated with a distribution list. For example, this association may be initially identified manually by the user when the contact is first saved in the address book, or it may be done automatically when the contact is saved in the address book after an address lookup is performed or after the contact information is otherwise retrieved from another computing device (e.g. downloaded from a desktop computer when synchronizing data between a desktop computer and a mobile device). The application may also provide a visual indication (e.g. an icon) beside each contact associated with a distribution list, when a list of contacts is displayed to a user.

The central message server is adapted to allow requesting devices to query the server for the individual addresses of a given distribution list maintained by the central message server. The individual addresses are also referred to in the specification and in the claims more generally as "member addresses". The format of the request and the returned results may differ depending on the specific type of message server, but generally, the message server will return a list of the current member addresses of a distribution list to a requesting device in response to the query.

Accordingly, in this embodiment, where an addressee of the message is determined to be a distribution list at step 410, then at step 420, the application queries the message server for the member addresses of the distribution list identified by the particular DL address. Each member address of that particular distribution list identifies an individual or other entity that is a potential recipient of the message composed by the user. Each potential recipient may also be referred to herein more generally as a DL "member".

At step 430, for each member identified by a member address of the distribution list obtained by querying the message server at step 420, a determination is made as to whether a certificate for the respective member (with the member's public key) is already stored on the computing device.

Optionally, at step 440, if a certificate for a given member is not already stored on the computing device, it may be searched for and retrieved (if found) from one or more certificate servers (e.g. LDAP server 284 of FIG. 4) or other certificate source. The computing device may be configured to search one or more pre-specified certificate servers at this step. The retrieved certificates may also then be stored more permanently in a certificate store on the computing device for future use, if desired.

Certain properties of the certificates associated with members identified by the addresses of the distribution list may also be verified prior to their use, such as their validity or trust status, their revocation status, or other certificate property. A new certificate may be searched for and retrieved at step 440, if the application is configured to do so.

At step 450, the application determines whether a certificate for each member identified by the addresses of the distribution list is available on the computing device, either stored in a certificate store or otherwise temporarily retrieved from a certificate store.

If a certificate for each and every member identified by the addresses of the distribution list is available on the computing device, then at step 460, the message can be encrypted to each member (e.g. by encrypting the session key associated with the message with the public key for each recipient). At step 462, the message is then sent directly to the distribution list, using the DL address. The DL address is not replaced by the addresses of the DL members since everyone on the distribution list can decrypt the message, and it is generally not desirable to increase the size of the message by expanding the DL address.

On the other hand, if a certificate for each and every member identified by the addresses of the distribution list is not stored on the computing device, then at step 470, the message is encrypted only to the members for which a certificate is available on the computing device. Additionally, the message is not sent directly to the distribution list using the DL address, but instead, the DL address is replaced by the addresses of the members for which a certificate is available on the computing device at step 480. Subsequently, the message is sent only to those member addresses at step 490. In this way, only recipients that are expected to be able to decrypt the encrypted message will be sent the encrypted message.

In a variant embodiment, where a check is made to ensure that a given certificate is valid, the message may be encrypted to and sent to only those members for whom a validated certificate is available on the computing device.

By resolving a DL address into individual addresses of intended message recipients, determining if a certificate is available on the computing device for each intended recipient so that the message can be encrypted to each recipient, and only sending the message to the specific recipients for whom a certificate is available on the computing device by replacing the DL address with the addresses of those specific recipients, the message can then be sent only to the recipients who are expected to be able to read the encrypted message. Replacing a DL address with multiple addresses may have the effect of increasing the size of the message, which may be considered generally undesirable. However, in this embodiment of the invention, a compromise is achieved by only replacing a DL address with its individual member addresses when not all of the members identified by the addresses of a distribution list would be able to decrypt a message that is sent in encrypted form.

Figure 8B:
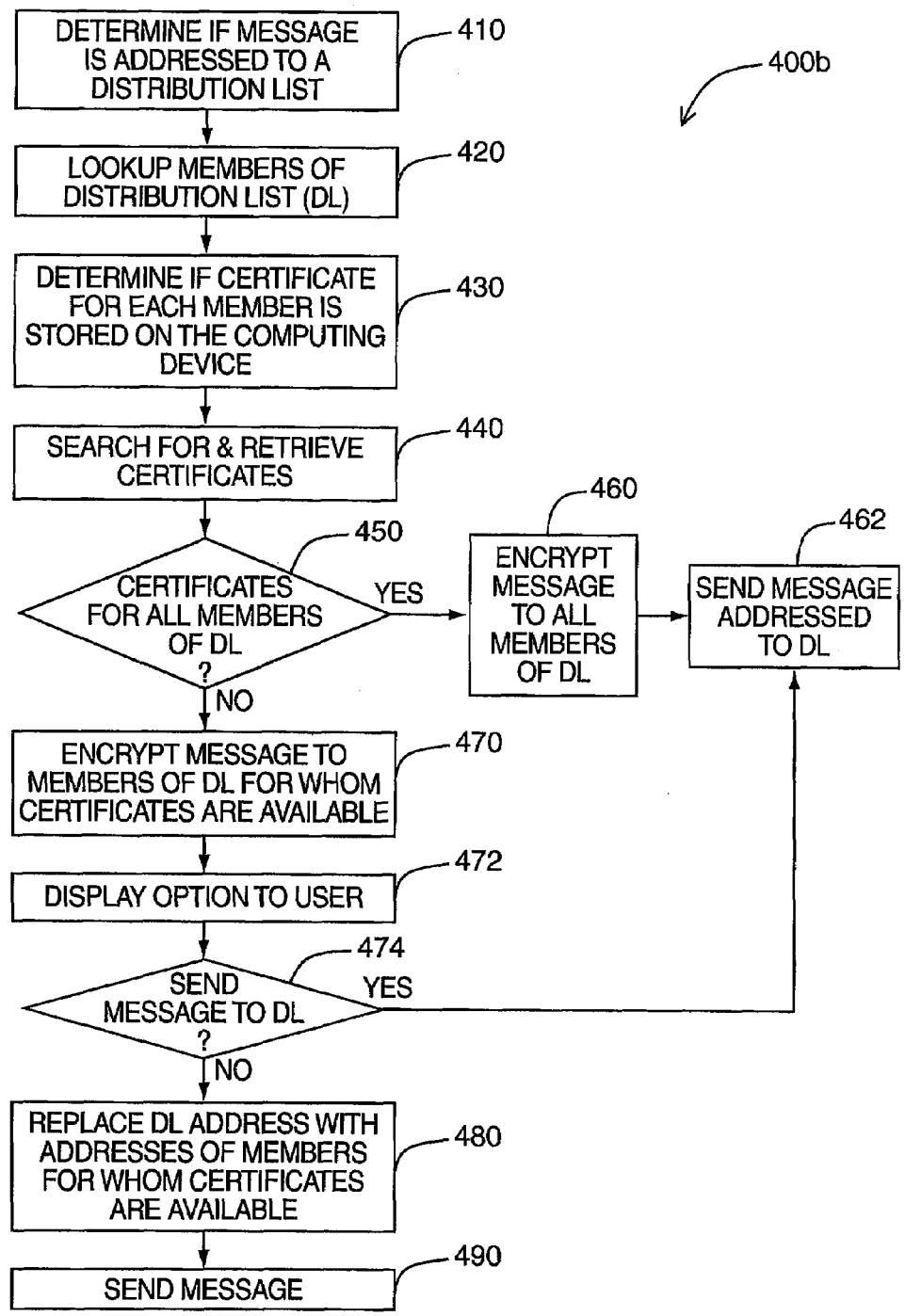
FIG. 8B is a flowchart illustrating steps in a method of sending encrypted messages to a distribution list in another embodiment of the invention.

Referring now to FIG. 8B, a flowchart illustrating steps in a method of sending encrypted messages to a distribution list in an embodiment of the invention is shown generally as 400b. Method 400b is similar to method 400, except that where the application has determined at step 450 that a certificate for each member identified by the addresses of the distribution list is not stored on the computing device, a user of the computing device is presented with an option to send the message to the DL address, despite the fact that only a subset of the members identified by the addresses of the distribution list will be able to decrypt the message.

More specifically, at step 472, an option is provided to the user to send the message to the DL address, despite the fact that not all of the members identified by the addresses of the distribution list will be able to decrypt the message. An indication may be displayed to the user warning that not all of the intended recipients will be able to decrypt the message.

At step 474, if the user chooses to send the message to the DL address, the message (encrypted only to members for whom a certificate is stored on the computing device at step 470) is sent to the DL address at step 462. On the other hand, if the user has chosen not to exercise the option, the message is sent only to the recipients who are expected to be able to decrypt the encrypted message, as described earlier with reference to steps 480 and 490 of FIG. 8A.

In FIGS. 8A and 8B, it is possible that a message may be addressed to more than one distribution list, each identified by a corresponding DL address. In that case, it will be understood by persons skilled in the art that certain steps of methods 400 and 400b may be repeated to resolve each DL address and replace each DL address with the member addresses of the respective DL address identifying members that are expected to be able to decrypt the encrypted message, before the message is sent.

Although embodiments of the invention have been described above with reference to distribution lists that are maintained on a server remote from the computing device on which the application (e.g. e-mail application) executes and resides, in variant embodiments of the invention, the distribution list may be maintained locally on the computing device itself. In that case, the distribution list may also be referred to as an address group that can be defined and modified by a user of the computing device. The methods described above may be modified to identify whether certificates are available for all members identified by addresses of such locally maintained distribution lists, and to provide a means for a sender to send messages only to those recipients who are expected to be able to decrypt an encrypted message to be sent by that sender.

In variant embodiments, the application may execute and reside on a computing device different from the computing device used by a user to send encrypted messages. For example, the application that implements a method of sending encrypted messages to a distribution list may execute and reside on an intermediate device (e.g. message management server 272 of FIG. 4) between the computing device used to send encrypted messages and a server that maintains the distribution list(s). This embodiment typically requires the intermediate device to maintain and/or access one or more certificate stores or sources.

The steps of a method of sending encrypted messages to a distribution list in embodiments of the invention may be provided as executable software instructions stored on computer-readable media, which may include transmission-type media.

The invention has been described with regard to a number of embodiments. However, it will be understood by persons skilled in the art that other variants and modifications may be made without departing from the scope of the invention as defined in the claims appended hereto.

The invention claimed is:

1. A method of sending encrypted messages, wherein acts of the method are performed at a first server, the method comprising:
receiving a message from a mobile communication device, wherein the message identifies a distribution list address in a header of the message;
determining one or more member addresses associated with the distribution list address;
for each member address, determining if a public key for a member identified by the member address is accessible by the first server;
for each member whose public key is accessible by the first server, encrypting the message to the member by employing asymmetric encryption at the first server using the public key for the member;
sending the encrypted message to a second server that maintains the distribution list, at the distribution list address, without replacing the distribution list address with member addresses if each of the one or more member addresses associated with the distribution list identifies at least one member whose public key is accessible by the first server;
at the first server, determining that not all members identified by the one or more member addresses associated with the distribution list are able to decrypt the message, if at least one of the one or more member addresses associated with the distribution list does not identify at least one member whose public key is accessible by the first server;
at the first server, expanding the distribution list address within the header of the message only after determining that not all members identified by the one or more member addresses associated with the distribution list are able to decrypt the message, by replacing the distribution list address with one or more member addresses that identify one or more members whose public key is accessible by the first server; and
sending the message to each of the one or more member addresses that identify one or more members whose public key is accessible by the first server if at least one of the one or more member addresses associated with the distribution list does not identify at least one whose public key is accessible by the first server.

2. The method of claim 1, further comprising querying the second server that maintains the distribution list, for the one or more member addresses associated with the distribution list address.

3. The method of claim 1, further comprising, for each of one or more members identified by the one or more member addresses associated with the distribution list address, searching for at least one certificate comprising the public key for the member.

4. The method of claim 3, further comprising, for each of one or more members identified by the one or more member addresses associated with the distribution list address, retrieving at least one certificate comprising the public key for the member.

5. The method of claim 4, further comprising verifying one or more properties of the retrieved at least one certificate comprising the public key for the member.

6. The method of claim 1, further comprising, for each of one or more members identified by the one or more member addresses associated with the distribution list address, verifying one or more properties of at least one certificate comprising the public key for the member.

7. A non-transitory computer-readable medium comprising a plurality of instructions executable on a first server, wherein the instructions, when executed, cause acts to be performed on the first server, the acts comprising:
receiving a message from a mobile communication device, wherein the message identifies a distribution list address in a header of the message;
determining one or more member addresses associated with the distribution list address;
for each member address, determining if a public key for a member identified by the member address is accessible by the first server;
for each member whose public key is accessible by the first server, encrypting the message to the member by employing asymmetric encryption at the first server using the public key for the member;
sending the encrypted message to a second server that maintains the distribution list, at the distribution list address, without replacing the distribution list address with member addresses if each of the one or more member addresses associated with the distribution list identifies at least one member whose public key is accessible by the first server;

at the first server, determining that not all members identified by the one or more member addresses associated with the distribution list are able to decrypt the message, if at least one of the one or more member addresses associated with the distribution list does not identify at least one member whose public key is accessible by the first server;

at the first server, expanding the distribution list address within the header of the message only after determining that not all members identified by the one or more member addresses associated with the distribution list are able to decrypt the message, by replacing the distribution list address with one or more member addresses that identify one or more members whose public key is accessible by the first server; and sending the message to each of the one or more member addresses that identify one or more members whose public key is accessible by the first server if at least one of the one or more member addresses associated with the distribution list does not identify at least one member whose public key is accessible by the first server.

8. A system for sending encrypted messages comprising a first server, the first server comprising a processor and a memory, wherein the processor is configured to perform acts comprising:

receiving a message from a mobile communication device, wherein the message identifies a distribution list address in a header of the message;

determining one or more member addresses associated with the distribution list address;

for each member address, determining if a public key for a member identified by the member address is accessible by the first server;

for each member whose public key is accessible by the first server, encrypting the message to the member by employing asymmetric encryption at the first server using the public key for the member;

sending the encrypted message to a second server that maintains the distribution list, at the distribution list address, without replacing the distribution list address with member addresses if each of the one or more member addresses associated with the distribution list identifies at least one member whose public key is accessible by the first server;

at the first server, determining that not all members identified by the one or more member addresses associated with the distribution list are able to decrypt the message, if at least one of the one or more member addresses associated with the distribution list does not identify at least one member whose public key is accessible by the first server;

at the first server, expanding the distribution list address within the header of the message only after determining that not all members identified by the one or more member addresses associated with the distribution list are able to decrypt the message, by replacing the distribution list address with one or more member addresses that identify one or more members whose public key is accessible by the first server; and sending the message to each of the one or more member addresses that identify one or more members whose public key is accessible by the first server if at least one of the one or more member addresses associated with the distribution list does not identify at least one member whose public key is accessible by the first server.

9. The system of claim 8, wherein said acts further comprise querying the second server that maintains the distribution list, for the one or more member addresses associated with the distribution list address.

10. The system of claim 8, wherein the processor is further configured to: for each of one or more members identified by the one or more member addresses associated with the distribution list address, search for at least one certificate comprising the public key for the member.

11. The system of claim 10, wherein the processor is further configured to: for each of one or more members identified by the one or more member addresses associated with the distribution list address, retrieve at least one certificate comprising the public key for the member.

12. The system of claim 11, wherein the processor is further configured to verify one or more properties of the retrieved at least one certificate comprising the public key for the member.

13. The system of claim 8, wherein the processor is further configured to: for each of one or more members identified by the one or more member addresses associated with the distribution list address, verify one or more properties of at least one certificate comprising the public key for the member.

14. A method of sending encrypted messages, wherein acts of the method are performed at a first server, the method comprising:

receiving a message from a mobile communication device, wherein the message identifies a distribution list address in a header of the message;

determining one or more member addresses associated with the distribution list address;

for each member address, determining if a public key for a member identified by the member address is accessible by the first server;

for each member whose public key is accessible by the first server, encrypting the message to the member by employing asymmetric encryption at the first server using the public key for the member;

at the first server, determining that not all members identified by the one or more member addresses associated with the distribution list are able to decrypt the message, if at least one of the one or more member addresses associated with the distribution list does not identify at least one member whose public key is accessible by the first server;

if each of the one or more member addresses associated with the distribution list identifies at least one member whose public key is accessible by the first server, sending the encrypted message to a second server that maintains the distribution list, at the distribution list address, without replacing the distribution list address with member addresses; and if at least one of the one or more member addresses associated with the distribution list does not identify at least one member whose public key is accessible by the first server, providing an option of sending the encrypted message to the second server that maintains the distribution list, at the distribution list address, if at least one of the one or more member addresses associated with the distribution list does not identify at least one member whose public key is accessible by the first server, determining if the option is exercised, sending the encrypted message to the second server that maintains the distribution list, at the distribution list address, if the option is exercised, at the first server, expanding the distribution list address within the header of the message only after determining that not all members identified by the one or more member addresses associated with the distribution list are able to decrypt the message, by replacing the distribution list address with one or more member addresses that identify one or more members whose public key is accessible by the first server if the option is not exercised, and sending the message to each of the one or more member addresses that identify one or more members whose public key is accessible by the first server if the option is not exercised.

15. The method of claim 14, wherein said method further comprises querying the second server for the one or more member addresses associated with the distribution list address.

16. The method of claim 14, further comprising: for each of one or more members identified by the one or more member addresses associated with the distribution list address, searching for at least one certificate comprising the public key for the member.

17. The method of claim 16, further comprising: for each of one or more members identified by the one or more member addresses associated with the distribution list address, retrieving at least one certificate comprising the public key for the member.

18. The method of claim 17, further comprising verifying one or more properties of the retrieved at least one certificate comprising the public key for the member.

19. The method of claim 14, further comprising: for each of one or more members identified by the one or more member addresses associated with the distribution list address, verifying one or more properties of at least one certificate comprising the public key for the member.

* * * * *